(No Model.)
C. JERNANDER.
AUTOMATIC BELT TIGHTENER.
No. 470,134. Patented Mar. 1, 1892.
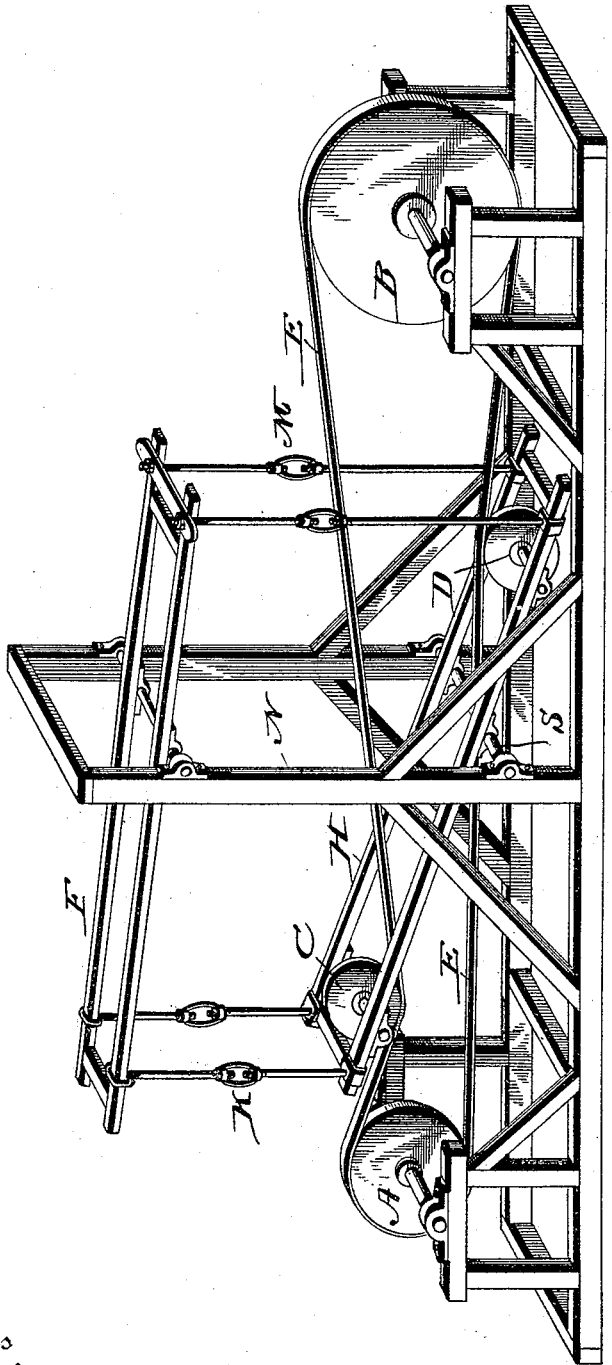
Witnesses
Albert Speiden
Lillie M. Hillyard
Inventor
Carl Jernander.
By his Attorneys
R.S. & A.A. Lacey

UNITED STATES PATENT OFFICE.

CARL JERNANDER, OF LA CROSSE, WISCONSIN.

AUTOMATIC BELT-TIGHTENER.

SPECIFICATION forming part of Letters Patent No. 470,134, dated March 1, 1892.

Application filed October 30, 1891. Serial No. 410,334. (No model.)

*To all whom it may concern:*

Be it known that I, CARL JERNANDER, a citizen of the United States, residing at La Crosse, in the county of La Crosse and State of Wisconsin, have invented certain new and useful Improvements in Automatic Belt-Tighteners; and I do hereby declare the following to be a full, clear, and exact description of the invention, such as will enable others skilled in the art to which it appertains to make and use the same.

This invention relates to a belt-tightener which is designed to be automatic in its action within certain limits, being actuated by the slack in the loose side of the belt and adapted to maintain an even tension on the said belt under all conditions and circumstances.

The improvement consists of a carrier pivoted between its ends and having rollers on opposite sides of the pivotal point, one of the said rollers being farther removed from the said pivotal support of the carrier than the other. An auxiliary carrier similarly pivoted to the main carrier and located in a different plane thereto is connected at its ends with the main carrier by adjustable connections and serves in the capacity of an evener and as a means, with the said adjustable connections, to regulate the degree of tension on the belt.

The improvement also consists of the novel features and the peculiar construction and combination of the parts, which will be hereinafter more fully described and claimed, and which are shown in the annexed drawing, which is a perspective view showing the invention applied.

The endless belt E is shown supported on the pulleys A and B to illustrate the application of the invention. The carrier H, of suitable construction, is pivoted between its ends, preferably by being mounted on the cross-bar S, which is supported at its ends in the frame N and is provided with the pulleys C and D on opposite sides of the said pivotal point. The pulley C is at a greater distance from the axis of the carrier H than the pulley D and is adapted to travel on the upper portion of the said belt E, whereas the pulley D travels or presses up on the under portion of the said belt. The auxiliary carrier F is pivoted between its ends similarly to the carrier H, and is connected at its ends with the ends of the carrier H by the adjustable connections K and M, the latter being composed of two rods which have their opposing ends threaded and connected by a turn-buckle, substantially as shown.

The carrier H extends obliquely to the path of travel of the belt to permit the pulleys C and D to press on opposite sides of the opposite portions of the said belt. Obviously by shortening the connections K or M the pulleys C and D will be caused to press harder on the belt, thereby increasing the tension, and by lengthening the said connections the degree of tension on the said belt will be diminished. The degree of pressure on the two portions of the belt will be equalized by the tilting of the carrier on its axis.

Having thus described my invention, what I claim, and desire to secure by Letters Patent, is—

1. The combination, with an endless belt, of a tightener composed of a carrier pivoted at unequal distances from and having pulleys at its ends to travel and press upon the opposite portions of the said belt, the pulley on the longer portion of the carrier pressing down on the upper portion of the belt, and an auxiliary carrier similarly pivoted between and having its ends connected, respectively, with the opposite ends of the main carrier, substantially as and for the purpose described.

2. The combination, with an endless belt, of a carrier pivoted at unequal distances from and having pulleys at its ends, the pulley on the longer portion of the carrier pressing down on the upper portion of the belt, an auxiliary carrier similarly pivoted between its ends in a different plane from the main carrier, and adjustable connections between the ends of the main and the auxiliary carriers to regulate the degree of pressure of the said pulleys on the upper and the lower portions of the belt, substantially as described, for the purpose specified.

In testimony whereof I affix my signature in presence of two witnesses.

CARL JERNANDER.

Witnesses:
JOHN JACOB ESCH,
GEORGE WASHINGTON KNOX.